United States Patent [19]
Dembicki et al.

[11] Patent Number: 6,076,375
[45] Date of Patent: Jun. 20, 2000

[54] APPARATUS FOR DELIVERING A GLASS STREAM

[75] Inventors: Michael T. Dembicki, Pemberville; Garrett L. Scott, Toledo, both of Ohio

[73] Assignee: Owens-Brockway Glass Container Inc., Toledo, Ohio

[21] Appl. No.: 09/274,592

[22] Filed: Mar. 23, 1999

Related U.S. Application Data

[62] Division of application No. 09/030,402, Feb. 25, 1998, Pat. No. 5,925,161, which is a division of application No. 08/787,061, Jan. 22, 1997, Pat. No. 5,776,221, which is a continuation-in-part of application No. 08/374,371, Jan. 18, 1995, abandoned.

[51] Int. Cl.$^7$ ........................................................ C03B 5/26
[52] U.S. Cl. ........................ 65/326; 65/145; 65/356; 219/59.1; 222/146.2; 222/593
[58] Field of Search ............................. 65/145, 157, 326, 65/356; 222/593, 146.2; 219/59.1

[56] References Cited

U.S. PATENT DOCUMENTS

| | | | |
|---|---|---|---|
| 1,622,666 | 3/1927 | Peiler | 65/327 |
| 1,828,217 | 10/1931 | Barker, Jr. | 65/126 |
| 3,015,842 | 1/1962 | Stalego | 65/528 |
| 3,288,583 | 11/1966 | Sheldon | 65/502 |
| 3,291,584 | 12/1966 | Sheldon | 65/11 |
| 3,410,675 | 11/1968 | Dockerty | 65/129 |
| 3,508,904 | 4/1970 | Keefer | 65/326 |
| 3,554,726 | 1/1971 | Daly | 65/325 |
| 3,580,713 | 5/1971 | Schirm et al. | 65/327 |
| 3,589,879 | 6/1971 | Yantsev | 65/499 |
| 3,607,184 | 9/1971 | Williams | 65/83 |
| 3,625,671 | 12/1971 | Schirm et al. | 65/326 |
| 3,899,315 | 8/1975 | Siegmund | 65/23 |
| 3,960,530 | 6/1976 | Iyengar | 65/447 |
| 4,023,953 | 5/1977 | Megles, Jr. | 65/86 |
| 4,133,664 | 1/1979 | Aulich | 65/405 |
| 4,217,123 | 8/1980 | Titchmarsh | 65/405 |
| 4,247,320 | 1/1981 | Bansal | 65/134.7 |
| 4,299,609 | 11/1981 | Aulich | 65/405 |
| 4,305,747 | 12/1981 | Kirkman | 65/128 |
| 4,340,160 | 7/1982 | van Geel | 222/595 |
| 4,381,932 | 5/1983 | Olson | 65/66 |
| 4,457,771 | 7/1984 | Ambrogi | 65/66 |
| 4,466,818 | 8/1984 | Brongersman | 65/405 |
| 4,740,401 | 4/1988 | Barkhau | 428/34.6 |
| 4,875,917 | 10/1989 | Lentz | 65/403 |
| 4,897,100 | 1/1990 | Nice | 65/388 |
| 5,114,456 | 5/1992 | Weisenburger et al. | 65/327 |
| 5,204,120 | 4/1993 | Hirschberger | 425/132 |

*Primary Examiner*—Sean Vincent

[57] ABSTRACT

A method and apparatus for delivering a glass stream comprising a first inner layer and a second outer layer, comprising a generally vertical orifice, and delivering glass from a second source such that the glass from said second source provides an outer layer about the glass from the first source as it flows through said orifice. A resistance heated tube assembly is made of platinum or material having similar resistance heating properties and extends from a glass source to an orifice through which the glass flows from a glass source for the inner layer. The tube assembly includes a tube portion having an inlet end that communicates with the source for the outer layer and an outlet end that communicates with the source. The tube portion has an axis positioned at any angle ranging between the horizontal and vertical but preferably has an axis which is more vertical than horizontal. Flanges are secured to the ends of said tube portion, and the flanges are connected to an electric power supply. The cross sectional thickness of said flanges is preferably greater than the thickness of the tube portion. Each flange includes an annular groove adjacent its respective end of the tube portion into which the end of said tube portion extends. The flanges are welded to the tube portion. Flange heater modules surround each end of the tube portion.

8 Claims, 5 Drawing Sheets

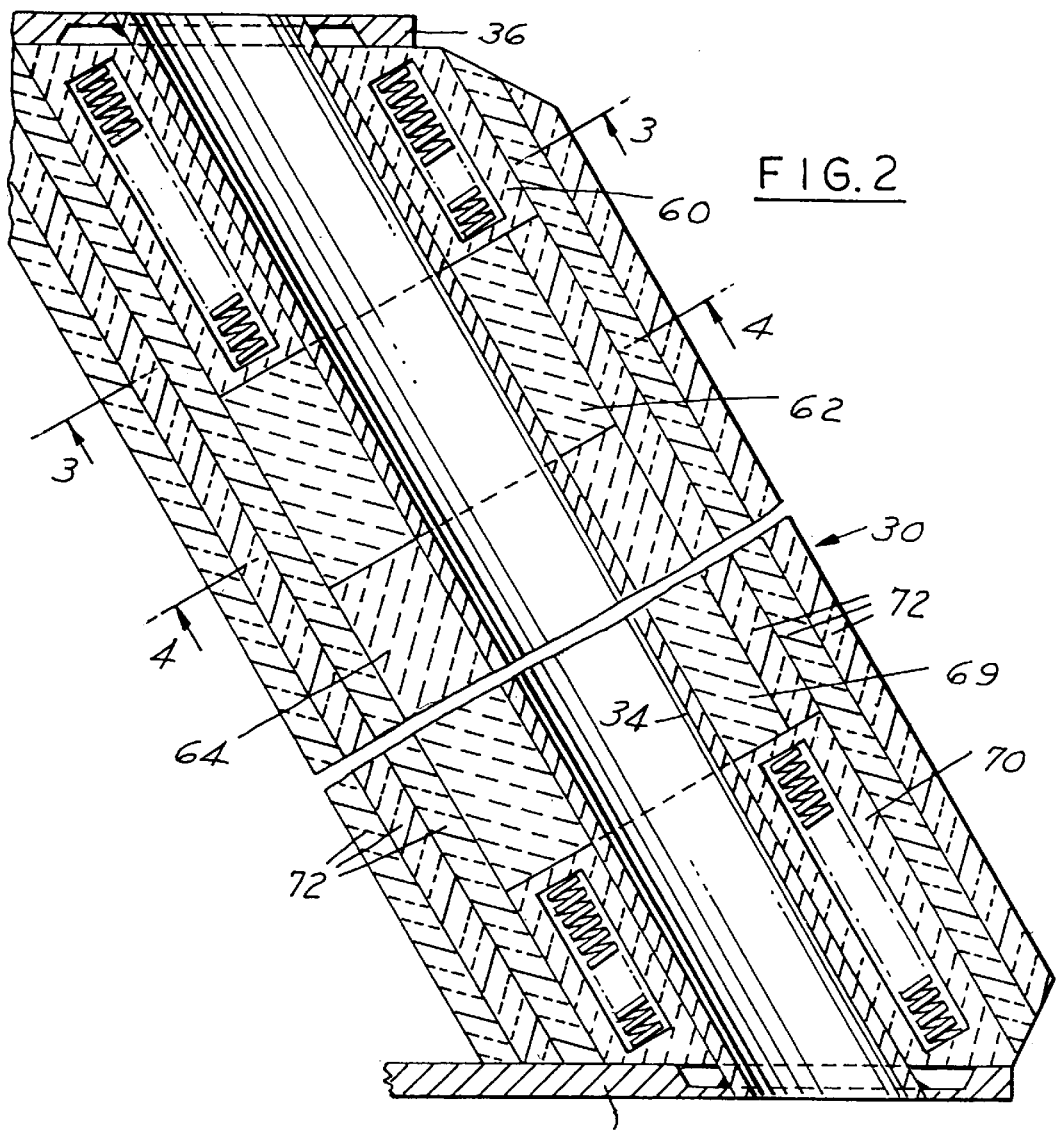
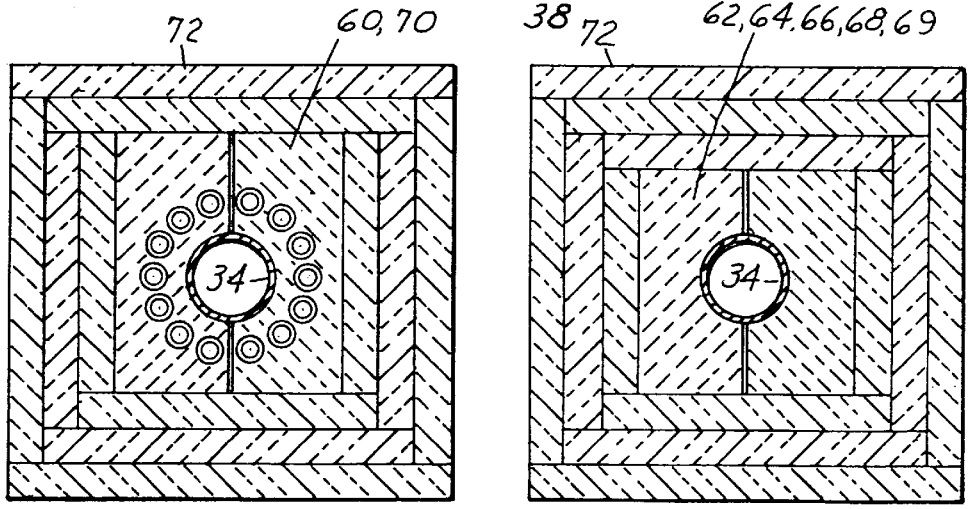
FIG.2
FIG.3  FIG.4

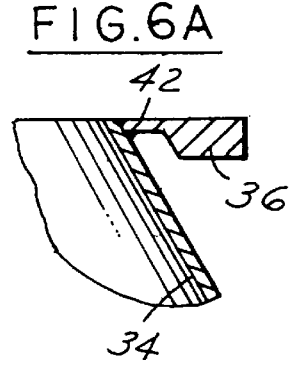
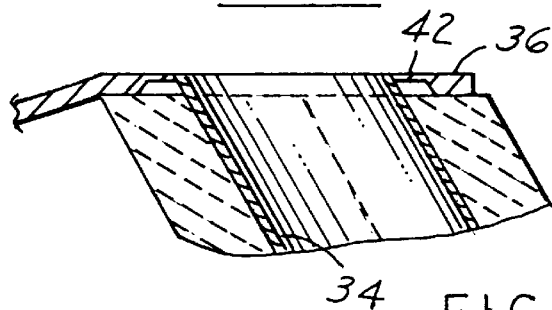
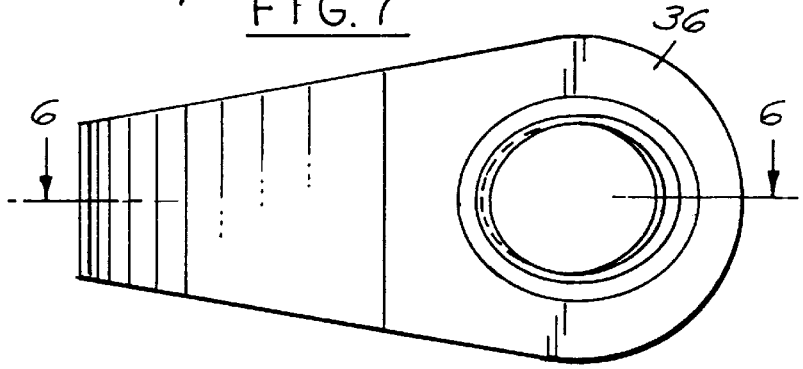
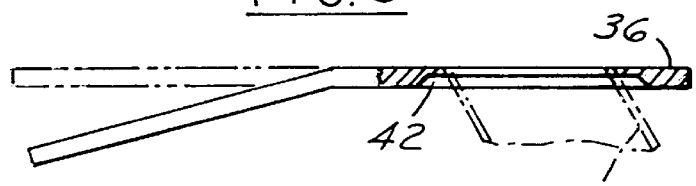
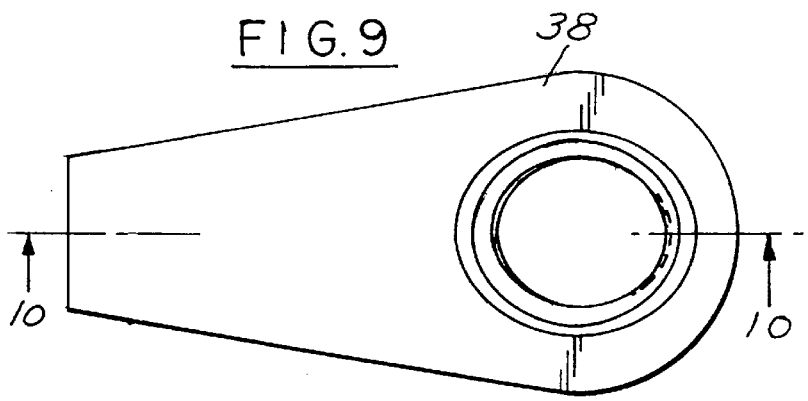

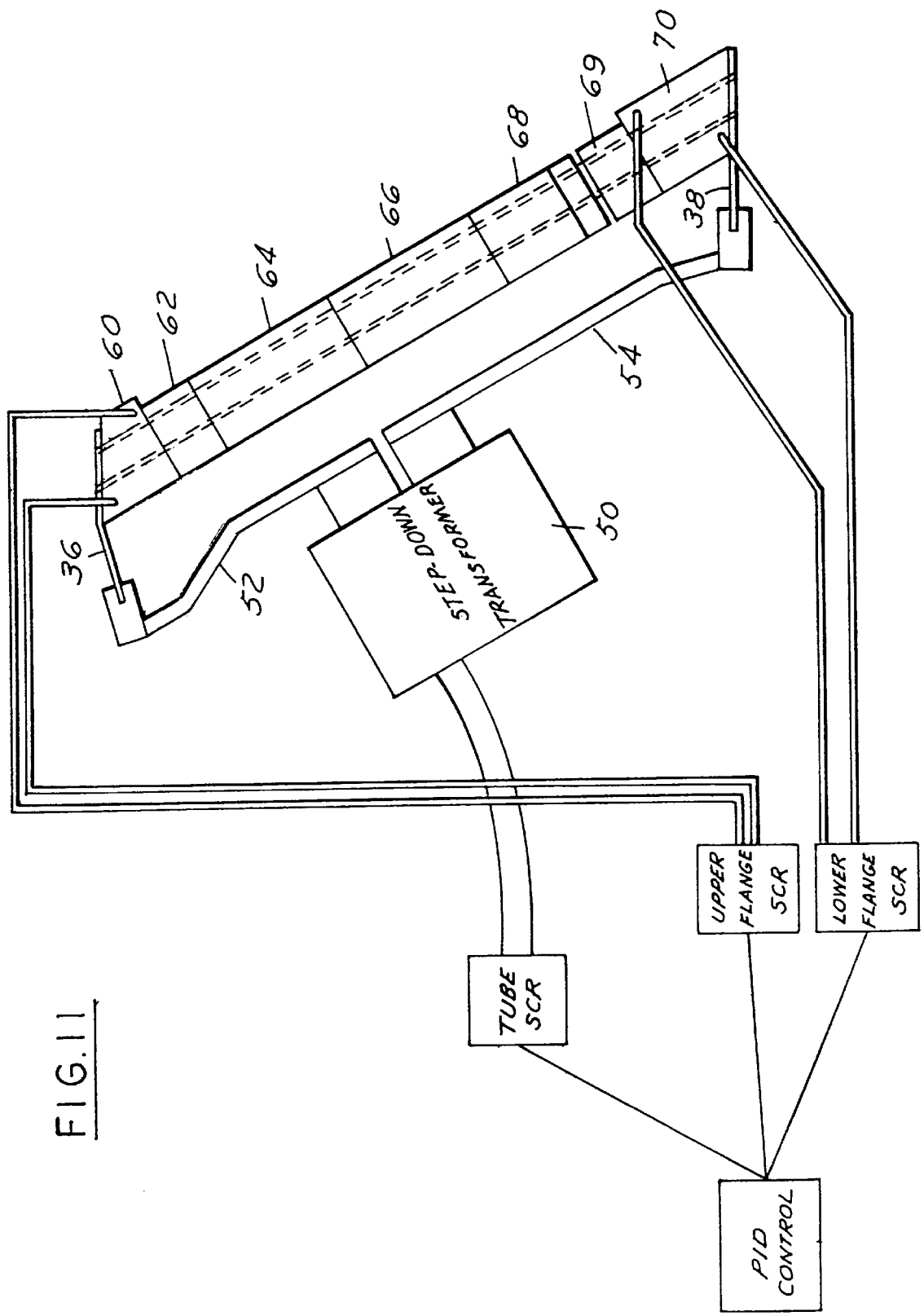

APPARATUS FOR DELIVERING A GLASS STREAM

This application is a division of application Ser. No. 09/030,402 filed Feb. 25, 1998 now U.S. Pat. No. 5,925,161, which is a division of application Ser. No. 08/787,061 filed Jan. 22, 1997 now U.S. Pat. No. 5,776,221, which is a continuation of application Ser. No. 08/374,371 filed Jan. 18, 1995 and now abandoned.

This invention relates to a method and apparatus for delivering a glass stream for forming charges of glass.

BACKGROUND AND SUMMARY OF THE INVENTION

The purpose of this invention is to deliver a stream of molten glass, at maintained temperature, to a remote location and particularly to combine two streams of molten glass in a location of limited size and accessibility.

Existing glass coating techniques involve the introduction of multiple glass streams in the forehearth or furnace section of the glass forming operation. This requires new equipment to be installed for the handling of main glass stream as well as the coating glasses.

Typical patents showing such construction, for example, are U.S. Pat. Nos. 1,828,217, 3,291,584, 3,554,726, 3,960,530, 4,023,953, 4,217,123, 4,299,609, 4,381,932 and 5,204,120.

Conventional forehearths for glass delivery are constructed of refractory brick. The glass is contained in a horizontal bath. Heat is maintained by radiant heating from combustion burners above the bath. Bath depth is limited to about 10" due to the practical limitations of infrared heat penetration. Alternately, electric current may be passed through the molten glass to maintain temperatures.

In either case, the glass is contained within the refractory ceramic brick. In a typical forehearth, the innermost refractories are very dense to resist glass attack. The outer layers are progressively less dense for their insulation properties. The overall wall thickness is typically from 10 to 18 inches. The overall width of the forehearth is several feet, therefore the placement of two forehearths in order to combine two glass streams is not possible.

The present invention provides for conveying glass from a remote location without the need for heavy refractories and radiant heating and in close proximity (4" to 12") to another glass stream.

The present invention is directed to a method and apparatus for delivering a glass stream comprising a first inner layer and a second outer layer, comprising a generally vertical orifice, delivering molten glass from a first source through said orifice, and delivering glass from a second source such that the glass from said second source provides an outer layer about the glass from the first source as it flows through said orifice.

Among the objectives of the present invention are to provide an improved method and apparatus for conveying the glass from the second source to provide the outer layer; wherein the glass is conveyed while efficiently maintaining uniformity of temperature of the glass; wherein a tube is heated by resistance heating; wherein the tube is constructed and arranged for efficient and uniform temperature distribution along the length of the tube; which is similar in function and smaller in design than a conventional forehearth; which minimizes changes in existing glass delivery equipment for the primary glass stream; which allows complete glass containment; and which provides for desired hydrostatic head pressure of the secondary glass stream.

In accordance with the invention, a resistance heated tube assembly is made of platinum or material having similar resistance heating properties and extends from a glass source for the outer layer to the orifice through which the glass flows from a glass source for the inner layer. The tube assembly includes a tube portion having an inlet end that communicates with the source for the outer layer and an outlet end. The tube portion has an axis positioned at any angle ranging between the horizontal and vertical but preferably has an axis which is more vertical than horizontal. Flanges are secured to the ends of said tube portion and the flanges are connected to an electric power supply. The cross sectional thickness of said flanges is preferably greater than the thickness of the tube portion. Each flange includes an annular groove adjacent its respective end of the tube portion into which the end of said tube portion extends. The flanges are welded to the tube portion. Flange heater modules surround each end of the tube portion.

DESCRIPTION OF THE DRAWINGS

FIG. 2 is a part sectional elevational view of a resistance heated tube assembly embodying the invention.

FIG. 3 is a sectional view of the tube assembly taken along the line 3—3 in FIG. 2.

FIG. 4 is a part sectional view taken along the line 4—4 in FIG. 2.

FIG. 6 is a fragmentary sectional view of the upper flange of the delivery tube taken along the line 6—6 in FIG. 7.

FIG. 6A is a fragmentary sectional view of a portion of the delivery tube shown in FIG. 6.

FIG. 7 is a top plan view of the upper flange of the delivery tube.

FIG. 8 is a part sectional side elevational view of the upper flange.

FIG. 9 is a bottom plan view of the lower flange of the delivery tube.

FIG. 10 is a part sectional side elevational view of a lower portion of the delivery tube taken along the lines 10—10 in FIG. 9.

FIG. 11 is a schematic of the electrical heating system of the delivery tube.

DESCRIPTION OF THE PREFERRED EMBODIMENTS

Figure 1:
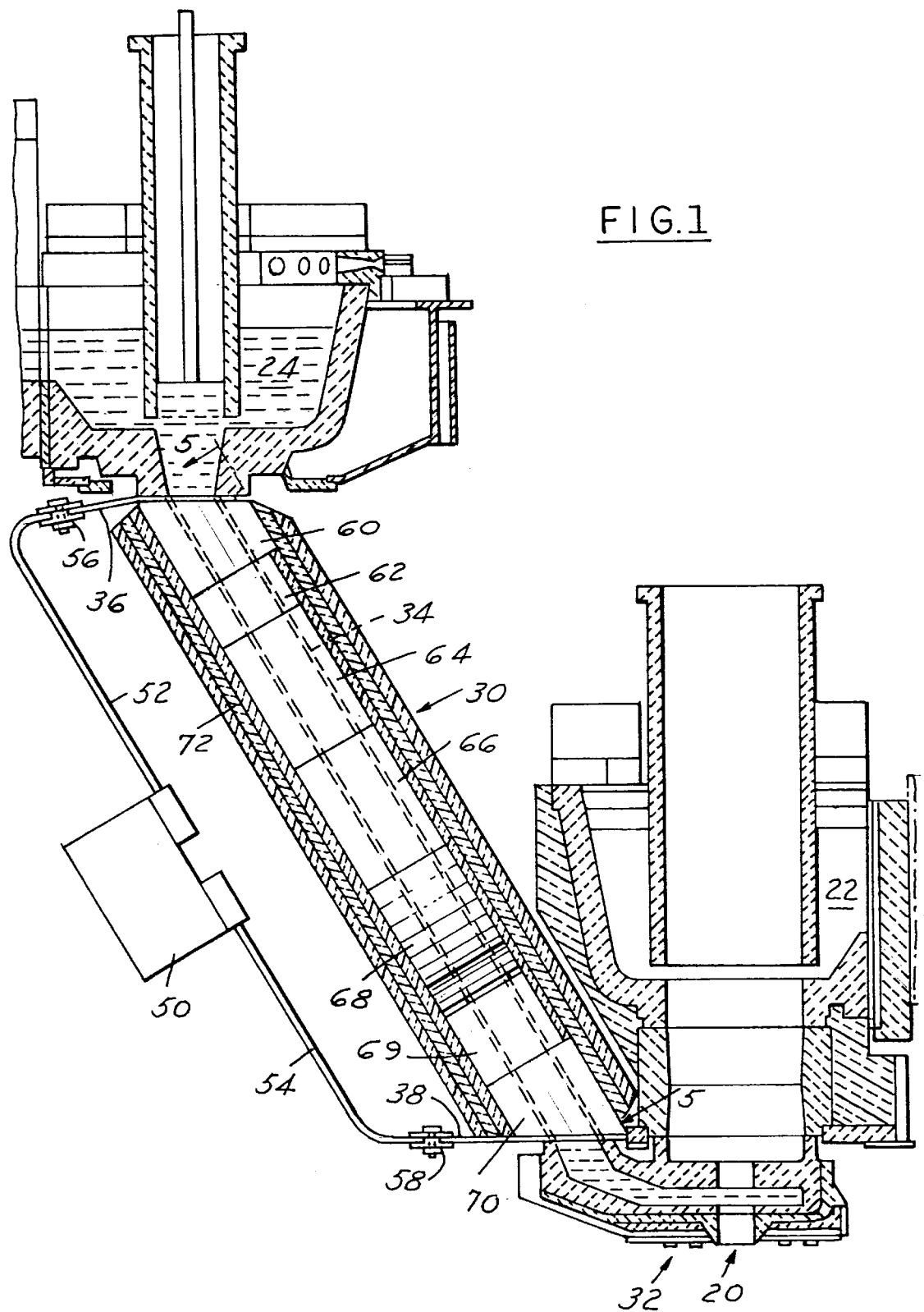
FIG. 1 is a fragmentary part sectional diagrammatic elevational view of a glass delivery system embodying the invention.

Referring to FIG. 1, the invention relates to a method and apparatus for delivering a glass stream comprising a first inner layer and a second outer layer, comprising a generally vertical orifice 20, delivering molten glass from a first source 22 through said orifice 20, and delivering glass from a second source 24 such that the glass from said second source 24 provides an outer layer about the glass from the first source 22 as it flows through said orifice 20. Glass sources 22, 24 comprise conventional forehearths.

In accordance with the invention, an electrical resistance heated delivery tube assembly 30 is provided for delivery of glass from the second source 24 through a refractory orifice ring assembly 32 which contains glass from the source 22 and the source 24 to provide a molten glass with a core of glass from source 22 and an outer layer from source 24.

As shown in FIG. 2, the tube assembly 30 includes a tube 34 through which the glass flows from a glass source for the outer layer. The tube 34 has an inlet end that communicates with the source for the outer layer and an outlet end. The tube 34 has an axis positioned at any angle ranging between the horizontal and vertical but preferably has an axis which is more vertical than horizontal. Flanges 36, 38 are secured to the ends of said tube 34. The tube 34 and flanges 36, 38 are made of a material that is corrosion resistant and can be electrically resistance heated. Platinum and its alloys are the preferred material. Other materials can be used such as Inconel or molybdenum, but these lack glass corrosion and air oxidation resistance offered by platinum at temperatures normally encountered with molten glass applications.

Flanges 36, 38 are welded to tube 34 such that the weld is uniform and electrically continuous around the joint, FIG. 6A. Thin spots cause localized over-heating while thick spots cause localized under-heating. The cross sectional thickness of said flanges is preferably greater than the thickness of the tube 34 and, the flanges 36, 38 and tube 34 are preferably uniformly thick. Referring to FIGS. 6–10 each flange 36, 38 includes an annular groove 42 adjacent its respective end of the tube 34 into which the end of said tube 34 extends and is welded. An electrical power supply 50 is connected across the flanges 36, 38 by electrical supply bars 52, 54 and connectors 56, 58 (FIG. 1).

Refractory blocks 60, 62, 64, 66, 68, 69 and 70 are placed about the tube 34 to provide mechanical support because the tube easily deforms at operating temperatures. Insulation 72 is placed around the blocks 60–70 to limit the loss of heat.

Referring to FIG. 11, in a typical example, a stepdown transformer (primary side) supplies (secondary side) power to the tube 30. The tube power supplies just enough heat to overcome normal heat loss when glass is flowing through the tube and additional heat to moderate glass flow during starting.

Additionally, flange heater blocks 60 and 70 provide auxiliary heat to the flanged ends of the tube 34. Power for the flange heaters is supplied by an ordinary silicon controlled recitifier (SCR) durable power controller. Temperature control is by means of a thermocouple-PID controller.

The flange heaters are turned on only during start-up and shut-down. The amperage necessary for each heater is different because they are different sizes. Typically, they used only 5–25 Amps at 50–150 volts.

Figure 5:
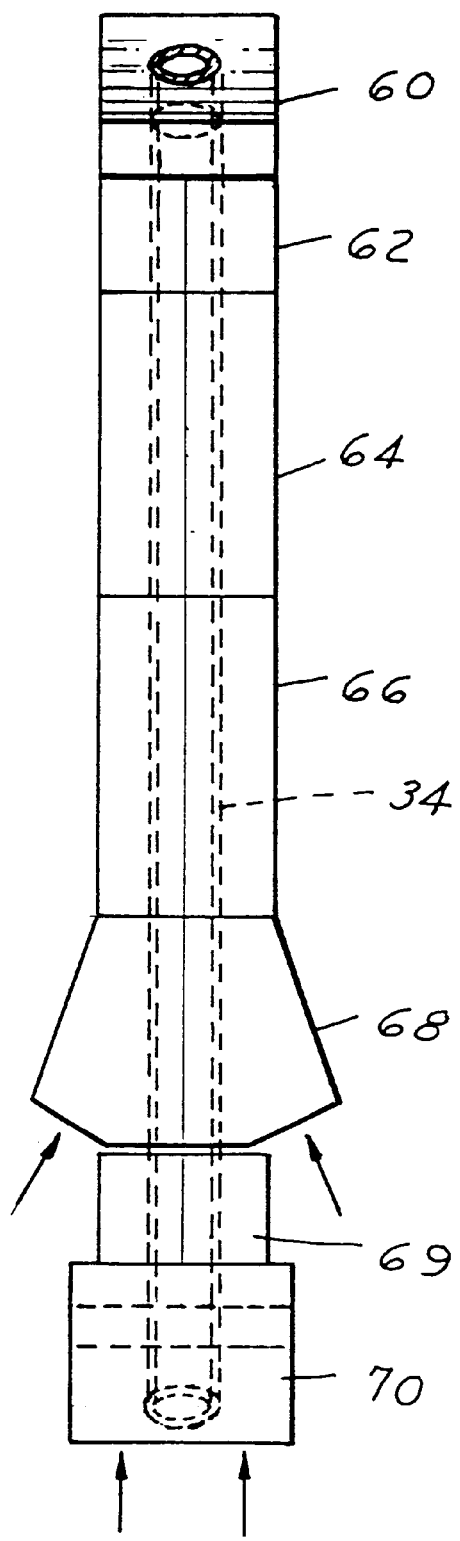
FIG. 5 is a fragmentary elevational view taken along the line 5—5 in FIG. 1.

As shown in FIG. 5, there is a variable gap between refractory blocks 68 and 69 to allow for longitudinally thermal expansion differences between the refractory blocks 60–70 and the tube 34 while at operating temperatures. As shown in FIG. 5, the two sets of arrows on the wedge shaped blocks indicate the position of steel support brackets. These brackets support the entire weight of the refractory blocks. Since, the upper flange 36 rests on the upper flange block 60, the brackets must also support the weight of the tube 34 as well. The two arrows at the lower portion of the tube assembly indicate another set of steel support brackets. These brackets support only the pair of lower flange heater block 70 and refractory block 69.

The lower bracket is movable along the axis of the tube. When the tube is hot, it expands downward, for example, nearly ½", which means the end of the tube extends ½" past the lower flange heater. Platinum is very soft, at operating temperatures that can reach 2300 F. The exposed tube end and flange are subject to bending if not supported. By adjusting the lower bracket downward, the lower flange heater block can be brought into supportive contact with the flange 38.

In operation, it is desired that the tube be heated evenly, but not the flanges. This means that the flanges must be a better conductor than the tube. One way to achieve this is to make the overall cross-sectional thickness of the flanges much greater than the tube. Another way is to make flanges from a material with a much higher conductivity than the tube. Since the tube must carry a high current at high temperatures and provide corrosion resistance to molten glass, it would be difficult to fabricate a tube/flange structure using dissimilar metals.

In practice, any type of glass can be used which in its molten state does not exceed the temperature limit of the alloy of tube 34.

Heating

The delivery tube assembly 30 conveys molten glass from source 24 to orifice 20. To be effective, the tube assembly 30 must supply heat to the glass to make up for natural conduction losses, but it also must maintain a uniform temperature over its length to prevent thermal gradients in the glass.

The delivery tube assembly has two types of heating:
(1) Direct resistance heat from power being applied to each end, with the tube acting as the resistor;
(2) External auxiliary heat applied to each end.

Tube Flanges

Wide flanges 36, 38 terminate each end of the tube 34. They allow sealing of the tube 34 to adjacent equipment, which in the example shown, is the underside of the spout feeding glass from the source 24 above, and the upper side of the orifice ring assembly 32 into which the glass delivered. The flanges 36, 38 also serve as electrical connection points.

Flange Design

The end flanges 36, 38 are designed to distribute electrical power (for resistance heating) into the tube portion 34. This design allows electrical power to flow evenly around the periphery of the flange thereby heating the circumference.

The cross-sectional thickness of the flanges 36, 38 preferably is much greater than the tube 34, such that most of the resistance heating occurs in the tube 34 rather than the flanges 36, 38. Due to the nature of thermal conduction, heat loss will be greater at the ends of the tube 34, so some degree of heating is needed in the flanges 36, 38. Referring to FIG. 6 to make up for thermal losses, the inner area of the flanges 36, 38 where they join the tube 34, have a reduced cross-section 42, causing some resistance heating to occur in the flanges 36, 38.

Flange Sealing

For a good operation, the flanges 36, 38 must be hot in the inner edge, to minimize thermal disturbance to the glass flowing inside, and cooler on the outer edge to form a seal. The shape of the flanges 36, 38 and the variations in cross-sectional thickness 42 are designed to meet these conditions.

When molten glass flows through the tube 34, it flows into the hot flange sealing area and may even leak. However, by design, the outer edge of the sealing surface is at temperature below the devitrification point of glass, typically about 1800° F. In this cooler area, the flow slows and stops as devitrification crystals form.

Flange Heating

For electrical resistance heating, power is applied to the flanges by large, water cooled copper clamps. The clamp area must be kept cool (under 200 F.) so electrical current transfer is maximized and copper oxidation is minimized.

Since cooling will draw heat from the flanges 36, 36 (over and above natural conduction losses), and, therefore the ends of the delivery tube, temperatures will be lower than along the length of the tube 34. The reduced cross section 42 in the flange causes an increase in resistance heating, thereby reducing this temperature loss.

Flange Seal Separation

Since the flanges 36, 38 are designed to form a seal with molten glass, they do not allow for easy separation. For this purpose, auxiliary flange heating blocks 60, 70 serve to provide extra heat to remelt the sealed ends (from devitrified glass) so the tube can be separated from mating surfaces.

Satisfactory results have been obtained utilizing the apparatus shown and described where the tube assembly has its axis at an angle of about 20° to the vertical and has a diameter of about three inches.

It can thus be seen that there has been provided a method and apparatus for conveying the glass from the second source to provide the outer layer; wherein the glass is conveyed while efficiently maintaining uniformity of temperature of the glass; wherein a tube is heated by resistance heating; wherein the tube is constructed and arranged for efficient and uniform temperature distribution along the length of the tube; which is similar in function and smaller in design than a conventional forehearth; which minimizes changes in existing glass delivery equipment for the primary glass stream; which allows complete glass containment; and which provides for desired hydrostatic head pressure of the secondary glass stream.

What is claimed is:

1. A resistance heated tube assembly for delivering molten glass comprising:

a tube of corrosion-resistant electrically conductive construction, and flanges secured to opposed ends of said tube for connection to an electrical power source, said flanges having flat portions with openings encircling said ends of said tube, in abutment with said ends of said tube, and being directly secured to opposed ends of said tube, an annular groove in said flat portion of each said flange surrounding said opening and said end of said tube, said grooves in said flanges being opposed to each other and forming portions of said flanges of reduced thickness directly secured to said tube ends, so that said portions of said flanges secured to said tube ends are hotter than portions of said flanges spaced radially outwardly from said tube ends.

2. The resistance heated tube assembly set forth in claim 1 including auxiliary heaters surrounding at least a portion of said tube.

3. The resistance heated tube assembly set forth in claim 2 wherein said heaters are adjacent the opposed ends of said tube.

4. The assembly set forth in claim 1 wherein each said flange has a greater cross sectional thickness than the thickness of said tube, such that said flanges are more electrically conductive than said tube.

5. The assembly set forth in claim 1 further comprising a plurality of refractory blocks about said tube between said flanges.

6. The assembly set forth in claim 5 wherein one of said flanges is disposed for abutment with an adjacent one of said refractory blocks.

7. The assembly set forth in claim 6 further comprises bracket means for supporting a one said refractory blocks opposite said one block.

8. The assembly set forth in claim 7 further comprising means for accommodating thermal expansion of said blocks between said one flange and said bracket means.

\* \* \* \* \*